Nov. 22, 1960

R. H. PREWITT ET AL 2,961,053

AIRFOIL STRUCTURE AND ASSEMBLY

Filed Jan. 7, 1953

INVENTORS.
RICHARD H. PREWITT &
THOMAS H. PURCELL, Jr.
BY

*Sidney W. Frick*

ATTORNEY

Nov. 22, 1960   R. H. PREWITT ET AL   2,961,053
AIRFOIL STRUCTURE AND ASSEMBLY
Filed Jan. 7, 1953   5 Sheets-Sheet 2

*INVENTORS*
RICHARD H. PREWITT &
THOMAS H. PURCELL, Jr.
BY

ATTORNEY

Nov. 22, 1960

R. H. PREWITT ET AL 2,961,053

AIRFOIL STRUCTURE AND ASSEMBLY

Filed Jan. 7, 1953

INVENTORS.
RICHARD H. PREWITT &
THOMAS H. PURCELL, Jr.
BY

ATTORNEY

Nov. 22, 1960 R. H. PREWITT ET AL 2,961,053
AIRFOIL STRUCTURE AND ASSEMBLY
Filed Jan. 7, 1953 5 Sheets-Sheet 4

INVENTORS.
RICHARD H. PREWITT &
THOMAS H. PURCELL, Jr.
BY
Sidney W. Frick
ATTORNEY Nov. 22, 1960     R. H. PREWITT ET AL     2,961,053
AIRFOIL STRUCTURE AND ASSEMBLY
Filed Jan. 7, 1953     5 Sheets-Sheet 5

INVENTORS.
RICHARD H. PREWITT &
THOMAS H. PURCELL, Jr.
BY
Sidney W Frick
ATTORNEY United States Patent Office 2,961,053
Patented Nov. 22, 1960

2,961,053

AIRFOIL STRUCTURE AND ASSEMBLY

Richard H. Prewitt, Wallingford, and Thomas H. Purcell, Jr., Springfield, Pa., assignors, by direct and mesne assignments, to Prewitt Aircraft Company, Clifton Heights, Pa., a corporation of Pennsylvania Filed Jan. 7, 1953, Ser. No. 330,126

15 Claims. (Cl. 170—159)

This invention relates to airfoils and airframes for aircraft and other aerial devices of all types, and particularly to rotor blades for helicopters or other rotary wing aircraft. It is also applicable to other structures wherein a high ratio of strength to weight is desirable.

Illustrative of the preferred practice of this invention, a substantially all metal and substantially hollow rotor blade is contemplated, having a main stress-resisting structure the walls of which are built up of thin sheets or laminations of a suitable material, preferably stainless steel; together with an associated web, an associated secondary stiffening structure of a suitable metal or combination of metals, preferably steel reinforced aluminum; and an enclosing envelope or skin consisting of a thin sheet of a suitable metal, again preferably stainless steel, all arranged to define and maintain the selected external contour and airfoil shape. Assembly and fastening of the various blade components is accomplished through the use of suitable adhesive materials, a method comprising prescribed sequential applications of pressure and heat, and the utilization of apparatus and tools specifically developed to facilitate the carrying out of such method.

One of the principal objects of the invention is the realization of a closer approach to the ideal construction of an airfoil or airframe structure as indicated by fundamental design considerations than has been achieved by previously known constructions, resulting in a structure of superior efficiency, with fewer constituent parts, with increased strength to weight ratio, and increased accuracy of external contour, and enabling simpler, cheaper and faster methods of fabrication and assembly. It is particularly adaptable to the construction of rotor blades for large diameter rotor systems, and to quantity production methods.

A further advantage of this invention is the greater homogeneity and improved uniformity of construction from blade to blade resulting therefrom, with consequent minimizing of the problem of balancing the blades intended for use in the same rotor system.

Emergence of the successful application of adhesives to the high strength bonding of metal to metal has materially facilitated progress toward realization of ideal design characteristics in, as well as simplicity and flexibility in the methods and apparatus for construction of, the fabricated structures of airfoils and airframes. However, there have been definite limitations in the types and methods of construction advanced and utilized prior to the present invention. In the design of a rotor blade, for instance, stress analysis will reveal the ideal distribution of strength characteristics throughout the structure, both spanwise and chordwise. Generally speaking, blade section design is a function of spanwise location. The root section must be designed for high centrifugal and static bending loads. The mid-section must be designed for moderate centrifugal loads combined with repeated bending stresses. The tip section must be designed to attain good chordwise balance and yet be strong enough to take the high air loads imposed when the blade tip experiences super-critical airspeeds. The objective is to adhere as closely as possible to the strength distribution indicated by this analysis in the fabricated structure, to achieve the lightest possible structure consistent therewith. Up to the time of this invention perhaps the most successful effort to achieve this objective has consisted in the utilization of a single tube to form, either by drawing or by machining or by a combination thereof, a structural spar element or member, sometimes assuming the shape of the nose contour. It is in this element of the blade assembly that the main weight or mass and stress-resisting strength of the blade is concentrated. These types of structures and methods of fabrication are not sufficiently flexible or adaptable to achieve optimum weight and strength distribution; they have been devised primarily for other than adhesive means of fastening or assembling; they require expensive tooling and time-consuming operations; they are wasteful of material; and they are prohibitive in the construction of large diameter type blades which are coming more and more into demand. It is accordingly a paramount objective of this invention to provide a structure largely overcoming these defects and adapted to achieve to the fullest extent possible the advantages of metal to metal adhesive bonding. The methods and apparatus utilized in the fabrication of the structure of this invention, contributing as they do to the achievement of its various objectives, are important parts thereof, as are the closely inter-related component parts of the overall blade assembly.

How the foregoing and other objectives which will be made apparent hereinafter are attained will appear more fully in the following description, referring to the accompanying drawings wherein:

Figure 1A is an enlarged perspective cutaway view of the root retention system of the rotor blade of Figure 1, indicated at 1A;

Figure 1B is an enlarged partial perspective sectional view along line 1B—1B of Figure 1, showing details of the inboard or root blade portion laminated nose construction with supplemental reinforcing laminations and with spar web and angle lamination supports;

Figure 1C is an enlarged partial perspective sectional view along line 1C—1C of Figure 1, showing details of the outboard or tip blade portion laminated nose construction with spar web and angle lamination supports;

Figure 1D is an enlarged sectional view along line 1D—1D of Figure 1, showing details of the blade trailing edge construction;

Figure 1E is an enlarged exploded perspective view showing details of the blade tip and trim tab assembly of Figure 1, indicated at 1E;

Figure 5:
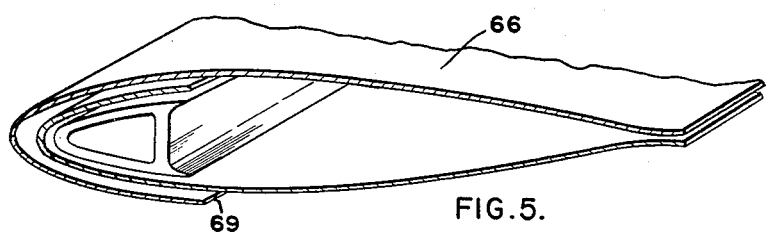
Figure 6:
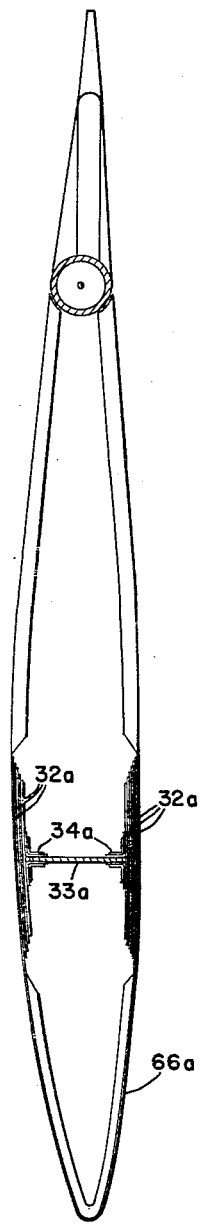
Figure 7:
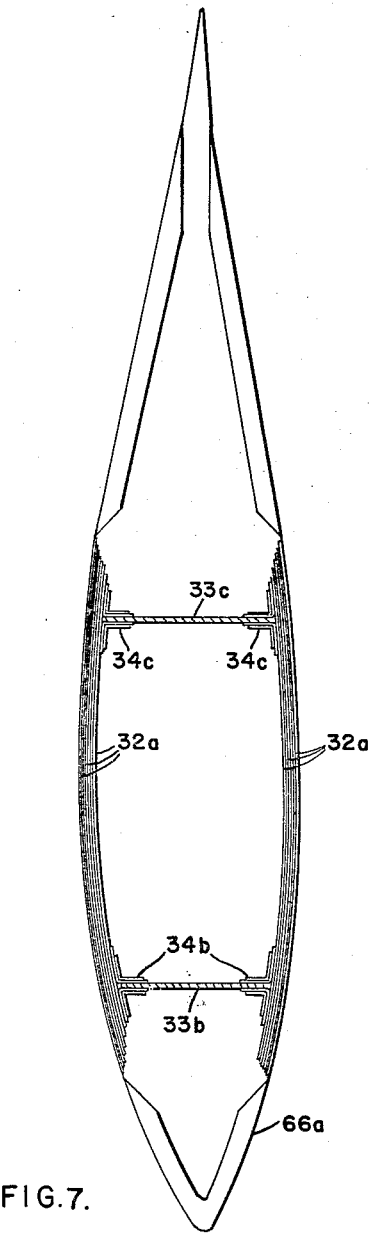

Figure 5 is a sectional perspective view of a portion of a large chord rotor blade requiring two sheets of metal to complete the skin, and showing the interlaminated construction thereof, omitting, however, the details of the internal structure of the aft portion of the blade; and Figures 6 and 7 are cross-sectional views of two typical fixed wings for high speed aircraft, illustrating the adaptability of the laminated construction of the present invention thereto.

Referring now to the drawings in detail, the rotor blade 31 is of all metal substantially hollow construction and has uniform aerodynamic contour and chord throughout the greater portion of its length, and optimum twist. It has for its main strength member or spar an enclosed hollow laminated structure, generally D-shaped in cross-section, comprising roughly the forward one-fifth or one-third portion of the blade and consisting of a series of stainless steel sheets 32, each approximately .010" thick, formed to assume the shape of the nose external contour and adhesively bonded together, and a vertical web 33 of stainless steel, approximately .10" thick, constituting the rear wall thereof. Supporting angle strips 34, also built up of a series of .010" stainless steel sheets, reinforce the attachment of web 33 to the structure, adhesive bonding being used for this purpose as well.

Figure 1:
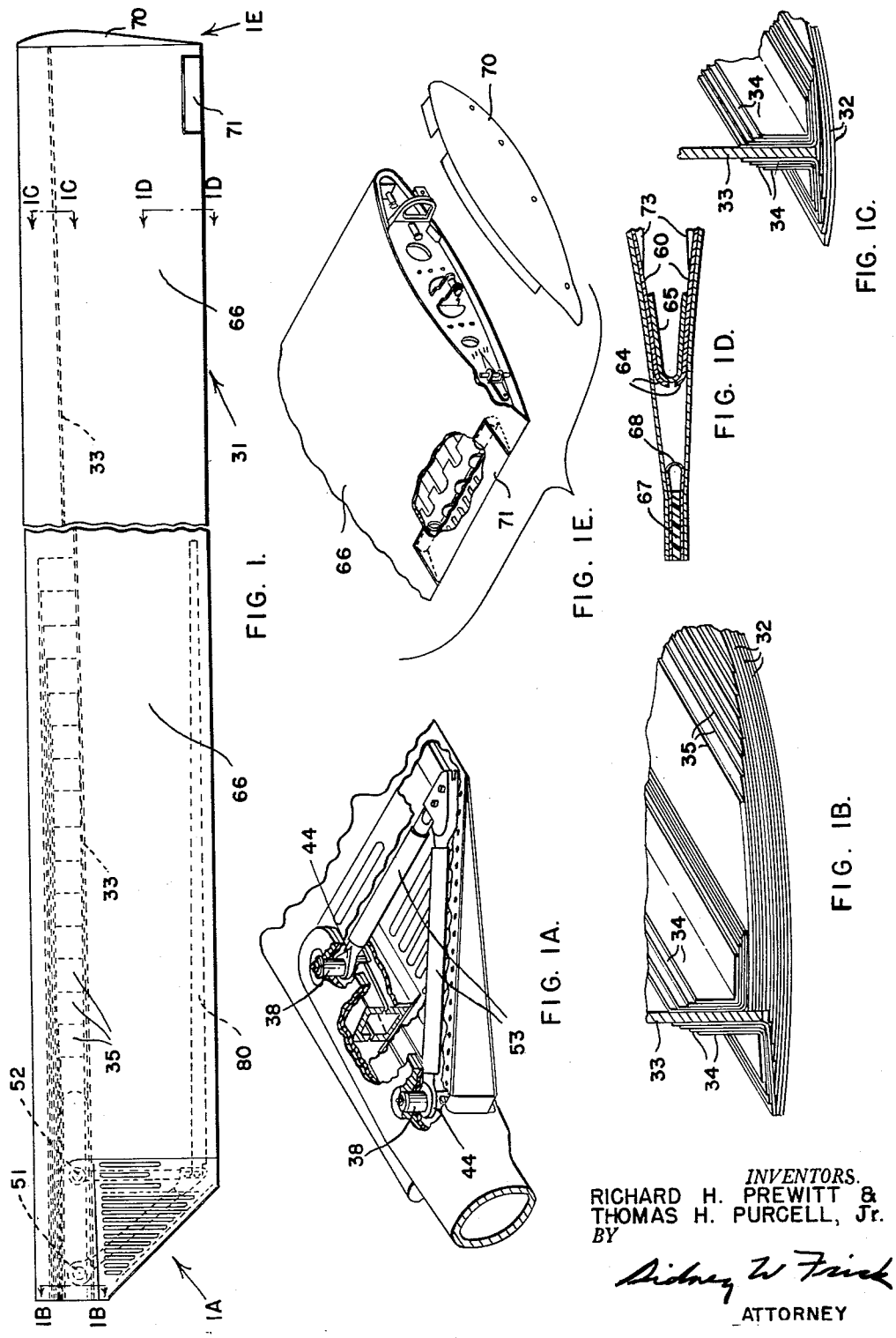
Figure 1 is a plan view of a typical rotor blade embodying the features of this invention, showing the general arrangement thereof.
Figure 2:
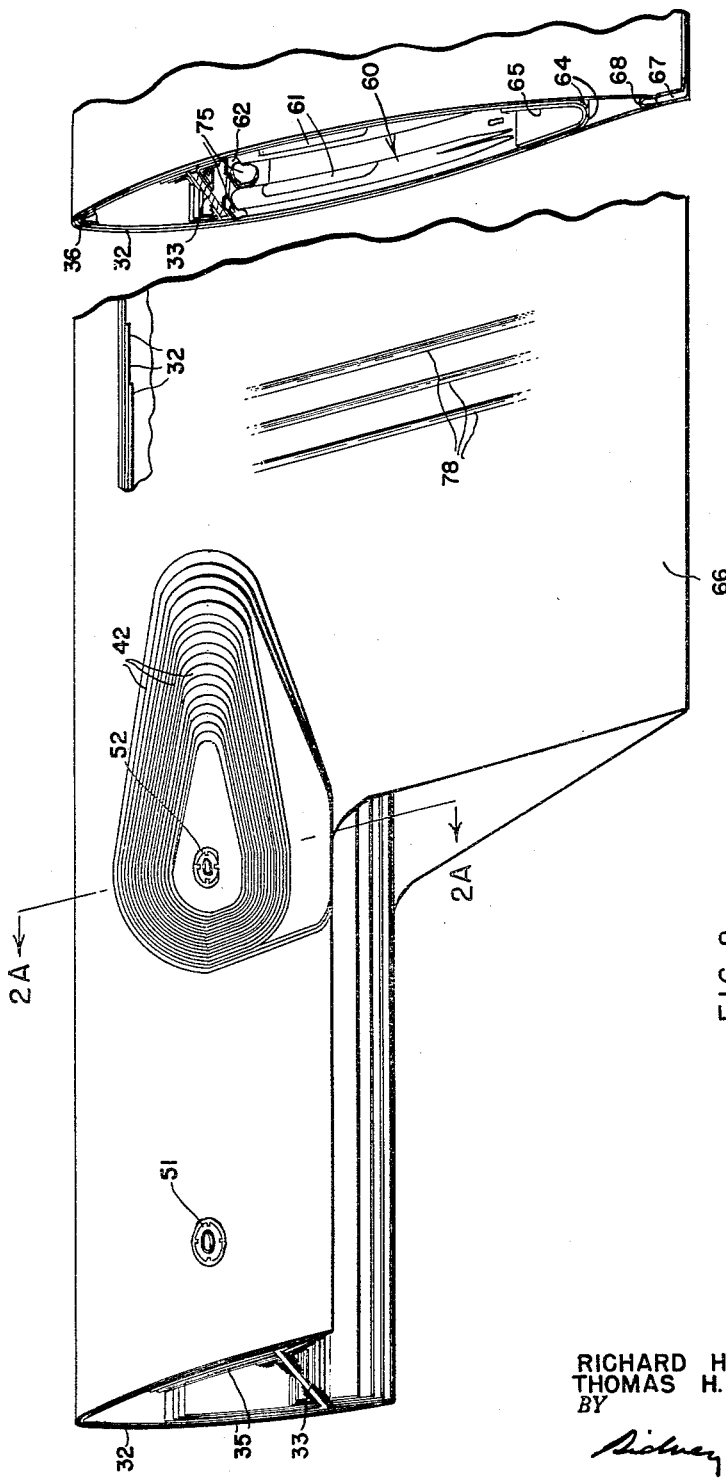
Figure 2 is an enlarged perspective cutaway view of portions of the rotor blade of Figure 1, showing details of the laminated construction of the nose or leading edge portion and variation therein along the span of the blade, also details of the internal construction of the aft portion of the blade, and "dimpling" of the skin aft of the spar web.

In the inboard portion of the spar, the wall thickness near web 33 is reinforced as needed by supplemental laminations of stainless steel sheets 35, approximately .010" thick, internally of, contiguous with and bonded to sheets 32, extending forward from the top and bottom portions of the forward face of the web 33 varying distances short of the leading edge, as shown in Figure 1B, and extending outboard varying distances as shown in Figure 1. At the tip of the spar, additional nose laminations 36, of stainless steel sheet, approximately .010" thick, internally of, contiguous with, and bonded to sheets 32, at the smallest radius curvature portion of the leading edge of the spar and extending aft along the top and bottom walls varying distances substantially short of the web 33, may be added for chordwise balancing purposes if necessary, as shown in Figure 2.

Figure 3:
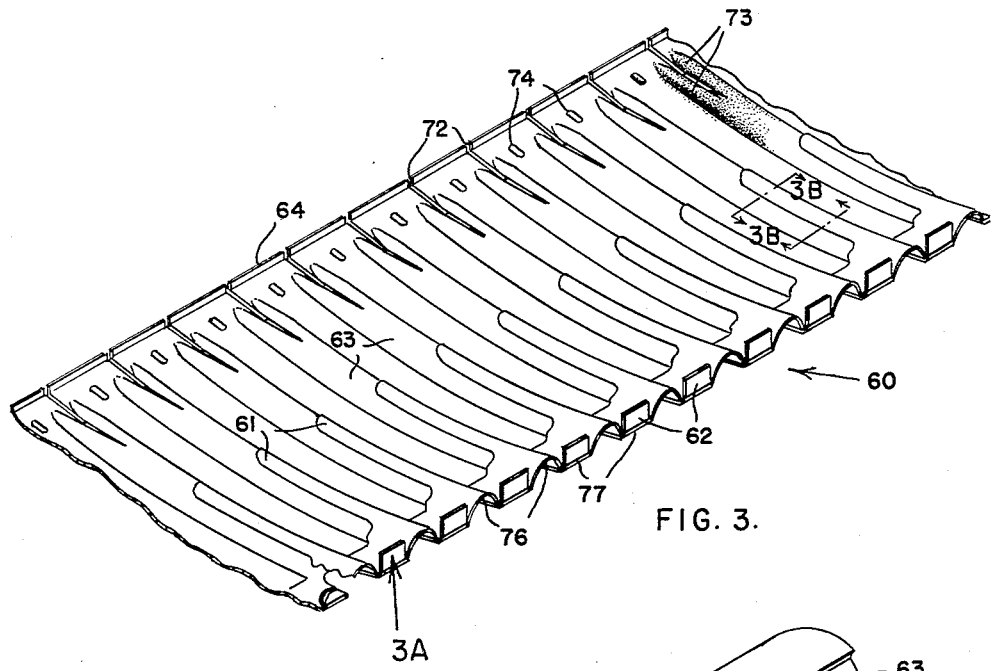
Figure 3 is a perspective detail view of a portion of the continuous beaded and reinforced stiffener comprising the internal structure of the aft portion of the rotor blade.

A secondary stiffening structure is incorporated into the remaining portion of the blade aft of the web 33 and comprises two continuous beaded stiffener members 60 made of aluminum with reinforcing stainless steel caps 61, as shown in Figure 3. Stiffener members 60 are adhesively bonded to the top and bottom portions of the aft face of web 33 and supporting angle strips 34, as indicated in Figure 2, shear tabs 62 providing additional surfaces for attachment to the web. Positioning of stiffener members 60 is such that their beads 63 run in the chordwise direction and have their convex surfaces facing inwardly of the structure toward each other, but separated from each other to form a substantially hollow structure. The aft edges 64 of the top and bottom stiffener members 60 are adhesively bonded together through the medium of an internal reverse strip 65 of stainless steel, being appropriately curved to assume the outer contour of the reverse strip 65, as indicated in Figure 3 and best shown in Figure 1D.

Figure 2A:
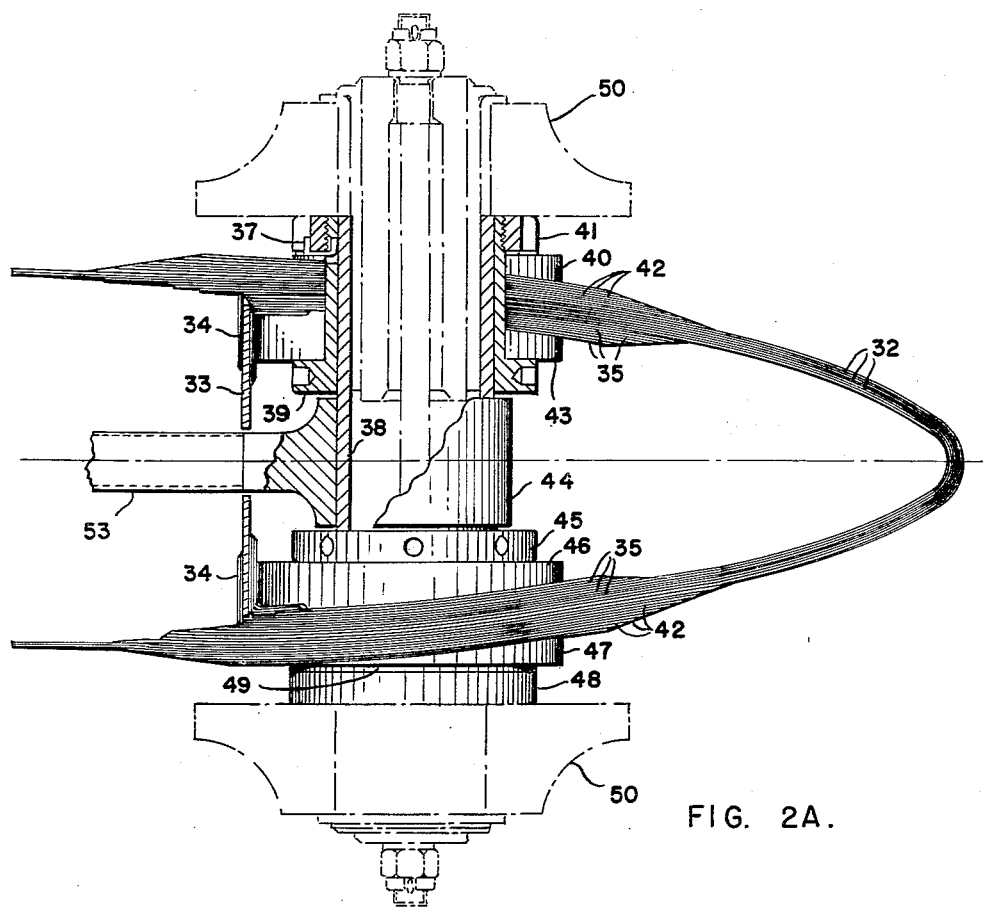
Figure 2A is an enlarged sectional view along line 2A—2A of Figure 2, showing further details of the laminated construction of that portion of the blade, as well as pin assembly means forming part of the root retention system.

Suitable root retention and rotor hub attachment means, such, for instance, as illustrated in Figures 1A and 2A, are incorporated into the inboard end of the blade structure. Holes 51 and 52 are bored through the top and bottom walls of the laminated structure of the blade assembly in its inboard portion forward of the web 33, as best shown in Figure 2. External laminated bosses, comprising series of sheets of stainless steel 42, approximately .010" thick, adhesively bonded together and to skin lamination 66, reinforce holes 52, as shown in Figures 2 and 2A. Holes 52 are provided with clamping assemblies made up of external spacers 40 and 47, and internal spacers 43 and 46, adhesively bonded to the respective spar wall surfaces as shown, bushings 39 and 45, extending through holes 52 and the respective spacers, and lockwashers 37 and 49, and nuts 41 and 48, completing the assemblies which are seen to provide effective clamping action holding together the laminations through which holes 52 are bored. Bushings 39 and 45 are bored, and pin 38, assembled with lug 44 of strut 53, is shrunk fit into the bushings, extending through the blade structure as shown. Pin 38 is then bored to provide access for rotor hub attachment means 50, as indicated in block outline in Figure 2A. Holes 51 are provided with similar means, except that external laminated bosses are not needed therefor.

A skin 66 of .010" thick stainless steel sheet stock envelops the entire assembly and has its aft edges adhesively bonded together at the trailing edge of the blade either directly or through the medium of a faying strip 67 of phenolic and a metal loop 68. While in smaller size blades the skin can be made of a single sheet, larger sizes require the use of two sheets, since stainless steel sheet stock is presently available only in width up to 36". When two sheets are used, an interlaminated construction is preferred, with the lap edge 69 on the under side of the blade, as shown in Figure 5. Whether one or more sheets are needed for the skin, however, one of the features of the construction is that the skin constitutes the outermost lamination of the spar structure, which is contemplated by the design calculations. The continuation of this outermost lamination to the trailing edge and its adhesive bonding to the secondary stiffening structure and in the forming of the trailing edge manifestly improves the structural integrity of the entire assembly.

A suitable heat and pressure set adhesive material is used as the fastening medium throughout the blade assembly. A faired or "revolution" tip 70 and a trim tab 71, shown in Figure 1E, completes the blade structure.

The laminated structure of the spar enables almost unlimited variations in weight and strength characteristics. Structural taper in blade 31 is achieved by stepping or dropping off laminations 32 at progressively greater radial distances from the root or inboard end of the blade, as dictated by design criteria, thus permitting concentration of strength where needed and ready elimination of weight and material where strength is not needed. Such means of achieving taper together with adhesive fastening facilitates elimination of local stress concentration points in the structure which result from mechanical fastening methods and other types of construction and which would lead to mechanical or fatigue failure. Improved vibration characteristics may also be readily achieved with the construction of this invention, since additional laminations may be added at any critical points to shift natural frequencies and thus avoid highly stressed conditions. Reinforcing strength as needed inboard of the blade is also easily obtainable in any degree indicated by the use of supplemental laminations 35 as previously described.

In order to maintain proper blade strength and balance with the tapered structure described, and with the constant planform blade 31, the spar web 33 is positioned at an angle to the lengthwise axis of the blade, being relatively more forward at the tip than at the root. The web positioned at the root is, for instance, approximately 30% of the chord aft of the leading edge, and moves progressively forward as it extends toward the tip until at the tip it is at a point, for instance, approximately 16.8% of the chord aft of the leading edge. Such positioning requires a progressive decrease in the vertical dimension of web 33 because of the progressive decrease in the inside vertical dimension of the nose contour proceeding toward the leading edge. This angular positioning of the web permits placement of the web at the inboard end of the blade aft of the inboard fitting and in a position to take the large shear forces that exist at the inboard end of the blade due to the droop forces acting in the static condition. Yet it is necessary to get the dynamic chordwise center of gravity ahead of the aerodynamic center which is usually at 24% to 27% chord, depending upon the airfoil. This is helped by moving the web member from the relatively aft position at the inboard end of the blade to a relatively forward position at the tip of the blade where the centrifugal forces are more effective due to the mass being located further from the axis of rotation. This chordwise shifting of the web member is particularly important near the tip of the blade where the stresses are lower and the number of laminations required in the nose is less. It should be noted that the values of 30% and 16.8%, above, are mentioned herein merely as a typical illustration. Such values may differ for different sets of blades, depending upon their particular design and application.

Fullest possible realization of the many advantages afforded by the laminated spar structure described above is dependent upon the successful development of each component part of the blade, and particularly the secondary stiffening structure. The stiffening structure has an important bearing on the overall blade weight and balance. It has a fourfold function: (1) to accurately form the aft portion of the blade airfoil section, (2) to carry chordwise loads from the aft portion into the spar, (3) to permit the skin to carry centrifugal forces of the aft structure elements longitudinally of the blade to the inboard fittings, avoiding skin buckling and failing, and (4) to increase the capacity of the blade to carry inplane bending by improving stiffness and shear strength for such loads. While the stiffening structure must satisfactorily perform the above tasks, it must be as light as possible, and it must have flexibility sufficient to allow the blade to bend in the flapwise direction without developing stresses above the allowable yield even though the spar develops a maximum stress at its outermost fiber which is nearer the neutral axis than the section just aft of the spar. This arrangement allows development of maximum stress in the spar without rupture in the thin gage skin aft of the spar. The continuous beaded stiffener members 60 were devised as best suited to achieve this overall objective in conjunction with blade 31. Each member comprises a single thin piece of aluminum with die-formed semicircular impressions or beads 63 therein, running in a transverse or chordwise direction and spaced approximately every one and a half inches along the length or spanwise direction. Sufficient strength is incorporated into these light stiffener members by the addition of reinforcing stainless steel caps 61 in chain strip form and placed along the beads 63 at their most highly stressed points. Necessary taper of beads 63 near the trailing edge to maintain airfoil contour shape of the stiffener members 60, and to provide clearance where top and bottom stiffeners approach each other and termination of the beads short of the trailing edge is accomplished by the cutting of slots 72 into the aft ends of the beads 63 and by deformation of the aft ends of the beads to form "frog-legs" 73, as shown in Figure 3. Excess metal between slots 72 resulting therefrom is compensated for by pressing small deformations 74 therein. Shear tabs 62 along the forward edges, as previously described, with dot reinforcements 75 of stainless steel as may be desired, complete the structure of the stiffener members 60.

Figures 3A, 3B:
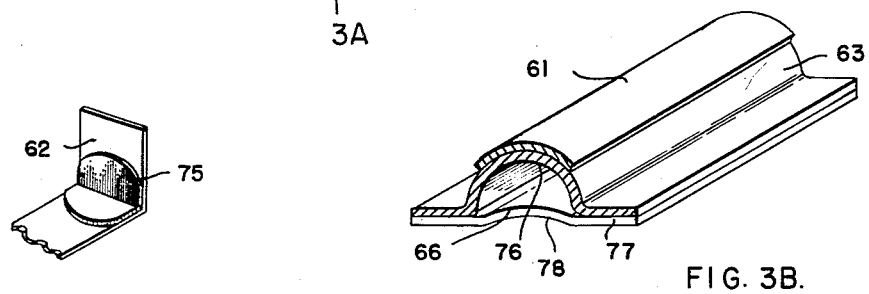
Figure 3A is a perspective detail view of a portion of the stiffener assembly of Figure 3, indicated at 3A, showing "dot" reinforcement of the shear tabs.
Figure 3B is a sectional perspective view of a portion of the stiffener assembly of Figure 3, taken between lines 3B—3B, with associated skin portion attached thereto, and showing, in exaggerated form, the "dimpling" of the skin.

In the bonding of stiffener members 60 to skin 66, sufficient pressure is applied to cause the concave depressions 76 of the stiffener beads to flatten toward the skin portions 78 bridging such depressions. After completion of bonding and release of pressure, the concave depressions tend to resume their previous shape and draw in the skin portions bridging them, as illustrated to an exaggerated degree in Figure 3B. The extent of such drawing in is controllable through control of the applied pressure. A slight "dimpling" or washboard appearance is thereby produced along the span of the blade aft of the web with the dimpling running from the web toward the trailing edge to the position wherein the beads taper off into the frog-legs 73, as indicated in Figure 2. The effect of such dimpling on aerodynamic efficiency is inconsequential. The dimpling, however, provides, as an important feature of the blade assembly, a consequent tendency in the skin 66, in flapwise bending, to bend inwardly into the concave depressions 76 of the stiffener beads rather than to buckle outwardly and pull away from its attachment to the stiffener members along the adhesively bonded outwardly presenting flat faces 77 thereof. This system obviates the necessity of use of "boxes" or separate sections making up the portion of the blade aft of the spar and attached only to the spar adjacent to each other throughout the span. The "box" system creates a notch effect causing induced air leakage losses and fatigue risers; the box sections are stiff; there is resulting non-uniformity of stress in the spar and greater blade flexibility in the plane of rotation which reduces the overall efficiency of the damping system being utilized. The dimpling system does away with these numerous disadvantages.

Figure 4:
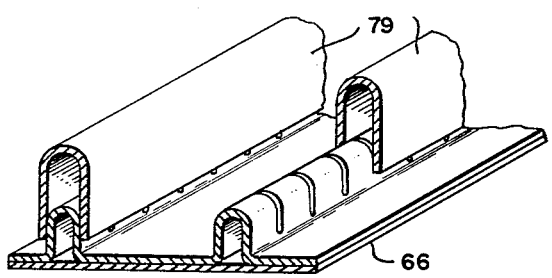
Figure 4 is a sectional perspective view of a portion of an alternative stiffener structure, the cap channel strip type, with associated skin portion.

Note that the effect of the changing position of the spar web 33, described above, requires the chordwise dimension of the stiffener members 60 to increase correspondingly from root end to tip. However, since the contour of blade 31 is unchanged from root to tip, only one master stiffener die need be made. The forward end of the stiffener sheet can then be cut to fit just aft of the web. An alternative type of stiffener structure is shown in Figure 4. This type, the cap and channel strip type, is most readily adapted to use in a tapered blade, since the cap strips 79 can be readily cut to fit the varying contour.

The width of the glue line between the aft edges of the skin 66 at the trailing edge of the blade has a maximum value for highest strength in any particular type of construction, dependent upon the thickness of the skin and material being bonded together. Faying strip 67, above mentioned, in such thickness as may be appropriate, is inserted between the skin surfaces at the trailing edge to achieve the optimum value of the ratio between glue line width and thickness of material being bonded. Metal loop 68 may be provided as support for the skin contour change into the trailing edge and to improve trailing edge stability. Reinforcing strip 80, indicated in Figure 1, lying along the trailing edge internally of the inboard portion of the blade, may be used in support of the root retention system, as needed.

Figures 6 and 7 are cross-sectional views of two typical fixed wings for high speed aircraft, incorporating therein and showing the adaptability of the features of this invention. Figure 6 is a tip section of a single web structure, while Figure 7 is a root section of a double web structure, each showing the laminated construction of the main strength portion of such wings.

Attainment of the objective of concentrating strength where needed and eliminating weight and material where strength is not needed, again through the medium of the laminated structure of the invention, is in these figures seen to manifest itself in a laminated main strength member the walls of which are built up of laminated 32a formed to assume the external contour of portions of the wing and adhesively bonded together, corresponding to the spar of the rotor blade hereinabove described, yet confining itself to the more gradually contoured portions of the airfoil in the midpart of its chordwise extent, according to the dictates of design criteria for this adaptation, rather than extending continuously (except for the outermost laminate at top and bottom which are integral portions of the all-encompassing skin 66a) about the most sharply curved portions of the airfoil at its leading edge as required by the rotor blade design criteria. Yet the wing embodiment of Figures 6 and 7 and the rotor blade embodiment of Figures 1, 2, etc., achieve the designated objective in just the same way, through judicious use and positioning of the proper number of laminates with their severally selected chordwise and spanwise extents. Incorporation of spar web 33a in the single web structure of Figure 6 and webs 33b and 33c in the double web structure of Figure 7 through the medium of joint angles 34a, 34b and 34c, respectively, is accomplished in the same way as is web 33 incorporated into the rotor blade, the laminated structure of Figures 6 and 7 similarly lending itself to such treatment.

Having now described and illustrated one form of our invention, we wish it to be understood that our invention is not to be limited to the specific form or arrangement herein described and shown. Other modifications and advantages of the present invention both with respect to its general arrangement and detailed features which may become apparent to those skilled in the art after a reading of the foregoing specification are each intended to be embraced within the scope and spirit of this invention as more particularly defined in the appended claims.

We claim:

1. In a rotor blade, a substantially hollow main strength member or spar constituting the leading edge portion of such rotor blade, having a generally D-shaped cross-section, with the forward curved wall thereof consisting of a plurality of thin sheets of metal adhesively bonded together and with the rear vertical wall thereof consisting of a generally flat rectangular cross-section metal web, having all but the outermost of the plurality of said thin sheets of metal terminating in the vicinity of the web, and having the outermost thin sheet of metal extend to envelop the entire rotor blade, thereby forming the skin thereof, the ends of said outermost thin sheet of metal terminating at the trailing edge of the blade, and having internal means aft of the web to support the aft part of the skin.

2. In a rotor blade, a substantially hollow main strength member or spar constituting the leading edge portion of such rotor blade, having a generally D-shaped cross-section, with the forward curved wall thereof consisting of a plurality of thin sheets of metal adhesively bonded together and with the rear vertical wall thereof consisting of a generally flat rectangular cross-section metal web, having all but the two outermost of the plurality of said thin sheets of metal terminating in the vicinity of the web, and having the said two outermost thin sheets of metal extend respectively from the vicinities of the top and bottom of the web in opposite directions forward to envelop the leading edge in overlapping relationship and then aft chordwise to the trailing edge of the blade along the bottom and top thereof respectively to form a two piece partially overlapping skin, and having internal means aft of the web to support the aft part of the skin.

3. In a rotor blade having substantially constant aerodynamic contour and chord throughout the greater portion of its length, a substantially hollow main strength member or spar constituting the leading edge portion of such rotor blade and shaped to assume the external contour of the leading edge, having its forward curved wall built up of a plurality of layers of thin sheets of metal adhesively bonded together, the number of said layers being greater at the inboard end of the blade than at its outboard end, and having for its aft wall a vertically oriented generally flat rectangular cross-section metal web positioned at an angle to the spanwise axis of the blade so as to be relatively more forward at the outboard end than at the inboard end in order to maintain chordwise balance and having its vertical dimension tapered correspondingly to match the progressively decreasing vertical clearance proceeding outboard and forward.

4. In a rotor blade, a substantially hollow main strength member constituting the leading edge portion of the blade and shaped to assume the external contour of the leading edge, having its forward curved wall built up of a plurality of layers of thin sheets of metal adhesively bonded together, the number of said layers being greater at the inboard end of the blade than at its outboard end, and having for its aft wall an elongated web positioned spanwise so that the ratio between its chordwise distance aft of the leading edge and the chord dimension is progressively less as it extends outwardly along the blade.

5. In a rotor blade, a substantially hollow main strength member or spar extending lengthwise throughout a major portion of the blade span having a forward wall which is shaped to define the external contour of the leading edge of the blade and built up of a plurality of layers of formed thin sheets of metal and adhesive material therebetween rigidly bonding them together, with the number of said layers being different in different portions of said wall, and having for its aft wall a vertically disposed generally flat rectangular cross-section web joining together the top and bottom aft ends of the forward shaped wall, a plurality of supplemental layers of thin sheets of metal in the inboard portion of the spar added internally to the forward shaped wall along a relatively flat portion thereof, being adhesively bonded thereto and one to another in succession, with successive ones of said supplemental layers extending chordwise from the forward face of the web toward the leading edge progressively lesser distances and extending span-wise in the outboard direction progressively lesser distances.

6. In a rotor blade, a substantially hollow main strength member or spar extending lengthwise throughout a major portion of the blade span having a forward wall which is shaped to define the external contour of the leading edge of the blade and built up of a plurality of layers of formed thin sheets of metal and adhesive material therebetween rigidly bonding them together, with the number of said layers being different in different portions of said wall, and having for its aft wall a vertically disposed generally flat rectangular cross-section web joining together the top and bottom aft ends of the forward shaped wall, and pluralities of supplemental layers of thin sheets of metal in the inboard portion of the spar superposed on and adhesively bonded to the innermost thin sheet of the forward shaped wall, extending forward from the forward face of the web along both upper and lower portions of the forward shaped wall for progressively lesser distances and extending outboard along the length of the blade for progressively lesser distances.

7. In a rotor blade, a substantially hollow main strength member or spar extending lengthwise throughout a major portion of the blade span having a forward wall which is shaped to define the external contour of the leading edge of the blade and built up of a plurality of layers of formed thin sheets of metal and adhesive material therebetween rigidly bonding them together, with the number of said layers being different in different portions of said wall, and having for its aft wall a vertically disposed generally flat rectangular cross-section web joining together the top and bottom aft ends of the forward shaped wall, and pluralities of layers of angular shaped thin sheets of metal extending spanwise throughout the greater portion of the length of the blade adjacent to the spar web being adhesively bonded to the top and bottom portions of the forward and aft faces of the web and to the adjacent innermost surfaces of the forward shaped wall of the spar and to each other successively.

8. A substantially hollow airfoil structure having a forwardly disposed main strength portion and an aft secondary stiffening portion and an external skin enveloping the whole in which the main strength member has a forward formed wall built up entirely of varying pluralities of thin sheets of metal of varying areas in size and adhesive material between said sheets bonding them together throughout their contact areas, said external skin comprising one of said thin sheets of metal, a web comprising the rear wall of said main strength member, a plurality of angle strips built up entirely of varying pluralities of thin sheets of metal of varying areas in size and adhesive material between said sheets bonding them together throughout their contact areas, each of said strips being adhesively bonded to said web and to said forward formed wall, means supplementing and reinforcing said main strength portion internally and externally and comprising selectively located varying pluralities of thin sheets of metal of varying areas in size and adhesive material between said sheets bonding them together throughout their contact areas and to the sheets comprising the forward wall of said main strength portion, means for balancing said airfoil structure comprising at least one thin sheet of metal of selected area and selectively located and adhesively bonded to and internally of the forward wall of said structure, all of said thin sheets of metal being of a single thickness and type of sheet stock material, resulting in a highly integrated structurally homogeneous structure providing basic strength, selective supplemental strength, selective reinforcing strength, web attachment, selective balancing, selective high strength in highly stressed areas and selective lightness in less stressed areas all while maintaining said integrity and homogeneity.

9. In a helicopter rotor blade having substantially constant aerodynamic contour and chord throughout the greater portion of its length, a substantially hollow main strength member or spar constituting the leading edge portion of such rotor blade and shaped to assume the external contour of the leading edge, having its forward curved wall built up of a plurality of layers of formed thin sheets of metal adhesively bonded together, the number of said layers being greater at the inboard end of the spar than at its outboard end, having for its aft wall a vertically oriented generally flat rectangular cross-section metal web positioned at an angle to the spanwise axis of the blade so as to be relatively more forward at the outboard end than at the inboard end in order to maintain chordwise balance and having its vertical dimension tapered correspondingly to match the progressively decreasing vertical clearance proceeding outboard and forward, having supplemental inboard end reinforcement means consisting of pluralities of thin sheets of metal adhesively bonded together, superposed on and bonded to the innermost thin sheet of the forward curved wall of the spar, and extending forward from the forward face of the web along both upper and lower portions of the forward curved wall for progressively lesser distances and extending outboard along the length of the blade for progressively lesser distances, having balancing means at the outboard end of the spar comprising at least one additional formed thin sheet of metal superposed on and bonded to the innermost thin sheet of the leading edge forward curved wall at the smallest radius curvature portion thereof and extending aft along the top and bottom portions of the wall and terminating substantially short of the spar web, having pluralities of layers of angular shaped thin sheets of metal extending spanwise throughout the greater portion of the length of the spar adjacent to the web and adhesively bonded to the top and bottom portions of the forward and aft faces of the web and to the adjacent innermost surfaces of the forward curved wall and to each other successively.

10. In the rotor blade of claim 9, internal secondary stiffening and aft aerodynamic contour maintaining means including an upper and a lower stiffener member, each being continuous spanwise throughout the greater portion of the length of the blade and chordwise from immediately aft of the spar web to a position short of the trailing edge of the blade, each said member comprising a thin sheet of metal having pluralities of alternate semi-circular internally convex beaded deformations and intermediate relatively flat outwardly presenting contour forming surfaces running chordwise at spaced intervals throughout the span of such member, said beaded deformations having metal cap reinforcement strips in chain form adhesively bonded to the more highly stressed portions of their convex surfaces, said beaded deformations terminating short of the aft edge of each member in tapered frog-leg deformations and slots, the aft edge of each member being curved inwardly, each member having a plurality of angular shear tabs along its forward edge with metal dot shaped reinforcements adhesively bonded thereto, the forward edges of said members being adhesively bonded to the top and bottom portions respectively of the aft face of the spar web by means of said shear tabs, and an internal reverse strip with the aft edges of said members being adhesively bonded together through the medium thereof.

11. In the rotor blade of claim 10, all but the two outermost of the plurality of layers of formed thin sheets of metal of which the forward curved wall of the spar is built up terminating in the vicinity of the spar web, with the said two outermost layers extending respectively from the vicinities of the top and bottom of the web in opposite directions forward to envelop the leading edge in overlapping relationship and then aft chordwise to the trailing edge of the blade along the bottom and top thereof respectively to form a two piece partially overlapping skin, being bonded adhesively to the lower and upper stiffener members respectively along their contour forming surfaces, a faying strip and a metal loop positioned between and adhesively bonded to the aft edges of said skin to form the trailing edge structure of the blade.

12. In the rotor blade of claim 11, the portions of the skin bridging the beaded deformations of the upper and lower stiffener members being slightly indented.

13. In the rotor blade of claim 9, root retention and rotor hub attachment means including a vertically disposed hole through a wall of the inboard portion of the blade forward of the web, an external laminated boss reinforcing said hole and comprising a plurality of thin sheets of metal adhesively bonded to the skin surrounding said hole and to each other successively, a clamping assembly comprising an external spacer adhesively bonded to the laminated boss surrounding said hole, an internal spacer adhesively bonded to the internal surface surrounding said hole, a bushing extending through said hole and having a threaded external end, a lock-washer and a nut on the said threaded external end, and a pin shrunk fit into said bushing.

14. A substantially hollow airfoil structure having a forwardly disposed main strength portion and an aft secondary stiffening portion and an external skin enveloping the whole in which the main strength member has a forward formed wall built up entirely of varying pluralities of thin sheets of metal of varying areas in size and adhesive material between said sheets bonding them together throughout their contact areas, said external skin comprising one of said thin sheets of metal, a web comprising the rear wall of said main strength member, a plurality of angle strips built up entirely of varying pluralities of thin sheets of metal of varying areas in size and adhesive material between said sheets bonding them together throughout their contact areas, each of said strips being adhesively bonded to said web and to said forward formed wall, said aft secondary stiffening portion including an upper and a lower stiffening member each being adhesively bonded to said web and each having a thin sheet of metal with a plurality of spaced semi-circular internally convex beaded depressions running chordwise with intermediate relatively flat outwardly presenting contour forming surfaces, said skin being adhesively bonded to said contour forming surfaces.

15. In a rotor blade, a secondary stiffening and contour maintaining means internally of the aft portion of the blade airfoil section having an upper and a lower stiffening member each including a thin sheet of metal having a plurality of spaced semi-circular internally convex beaded depressions running chordwise with intermediate relatively flat outwardly presenting contour forming surfaces, a skin forming the outer surface of the blade and enveloping said stiffening members and adhesively bonded to the contour forming surfaces thereof with the intermediate skin portions which bridge the beaded depressions being slightly dimpled to create a tendency for the skin to bend inwardly into said beaded depressions when the blade is subjected to flapwise bending.

References Cited in the file of this patent

UNITED STATES PATENTS

| | | |
|---|---|---|
| 1,542,412 | Reed | June 16, 1925 |
| 1,559,173 | Leitner | Oct. 27, 1925 |
| 2,009,265 | Hirschfield | July 23, 1935 |
| 2,202,042 | Blount | May 28, 1940 |
| 2,222,003 | Sloan | Nov. 19, 1940 |
| 2,273,919 | Allward | Feb. 24, 1942 |
| 2,377,962 | Preston | June 12, 1945 |
| 2,410,609 | Pecker | Nov. 5, 1946 |
| 2,451,131 | Vidal | Oct. 12, 1948 |
| 2,478,165 | Collins | Aug. 2, 1949 |
| 2,485,827 | Hartzell | Oct. 25, 1949 |
| 2,574,980 | Meyers | Nov. 13, 1951 |
| 2,580,363 | Schnitt | Dec. 25, 1951 |
| 2,588,570 | Pitcairn | Mar. 11, 1952 |
| 2,589,193 | Mayne | Mar. 11, 1952 |
| 2,593,714 | Robinson | Apr. 22, 1952 |
| 2,618,310 | Kerr | Nov. 18, 1952 |
| 2,621,140 | Bitterli | Dec. 9, 1952 |
| 2,630,868 | Ellenberger | Mar. 10, 1953 |
| 2,674,327 | Pullin et al. | Apr. 6, 1954 |
| 2,694,458 | Stevens | Nov. 16, 1954 |

FOREIGN PATENTS

| | | |
|---|---|---|
| 412,300 | Great Britain | June 28, 1935 |
| 606,924 | Great Britain | Aug. 23, 1948 |